(12) United States Patent
Lum et al.

(10) Patent No.: US 10,836,406 B2
(45) Date of Patent: Nov. 17, 2020

(54) DRONE RAILWAY SYSTEM

(71) Applicants: Peter Lum, Bartonsville, PA (US); Tiffany Lum, Bartonsville, PA (US)

(72) Inventors: Peter Lum, Bartonsville, PA (US); Tiffany Lum, Bartonsville, PA (US)

(*) Notice: Subject to any disclaimer, the term of this patent is extended or adjusted under 35 U.S.C. 154(b) by 265 days.

(21) Appl. No.: 16/032,318

(22) Filed: Jul. 11, 2018

(65) Prior Publication Data
US 2019/0144007 A1 May 16, 2019

Related U.S. Application Data

(60) Provisional application No. 62/586,329, filed on Nov. 15, 2017.

(51) Int. Cl.
| | |
|---|---|
| *B61B 3/02* | (2006.01) |
| *B64C 39/02* | (2006.01) |
| *B64D 47/00* | (2006.01) |
| *B61B 13/08* | (2006.01) |
| *B61B 1/00* | (2006.01) |

(52) U.S. Cl.
CPC ............ *B61B 3/02* (2013.01); *B61B 1/005* (2013.01); *B61B 13/08* (2013.01); *B64C 39/024* (2013.01); *B64D 47/00* (2013.01); *B64C 2201/128* (2013.01); *B64C 2201/14* (2013.01)

(58) Field of Classification Search
CPC .................................. B61B 3/00; B61B 3/02
See application file for complete search history.

(56) References Cited

U.S. PATENT DOCUMENTS

| | | | |
|---|---|---|---|
| 7,232,092 B2* | 6/2007 | Yamamoto | B64F 1/04 244/63 |
| 9,937,808 B2 | 4/2018 | Evans | |
| 10,112,728 B2 | 10/2018 | Evans | |
| 2016/0068264 A1 | 3/2016 | Ganesh et al. | |
| 2016/0140851 A1 | 5/2016 | Levy et al. | |
| 2016/0347450 A1 | 12/2016 | Raniere | |
| 2017/0015415 A1 | 1/2017 | Chan et al. | |
| 2017/0160735 A1 | 6/2017 | Mikan et al. | |
| 2017/0162059 A1 | 6/2017 | Jarrell | |

(Continued)

FOREIGN PATENT DOCUMENTS

| | | |
|---|---|---|
| CN | 101944295 | 9/2010 |
| KR | 101732713 | 5/2017 |
| KR | 20180063595 | 9/2019 |

*Primary Examiner* — Robert J McCarry, Jr.

(57) ABSTRACT

A drone railway system comprises a rail comprising a contact surface and an interconnect member having a drone connecting end and a rail engaging end, wherein the rail engaging end comprises a contacting member. The rail engaging end is selectively engageable with the rail so the contacting member can contact the contact surface and selectively disengageable with the rail so the drone and interconnect member can fly away from the rail, whereby the drone and interconnect member are able to travel along the length of the rail when the rail engaging end is engaged with the rail. A method of flying a drone comprises engaging a rail with the drone by contacting a contact surface of the rail with a contacting member associated with the drone; traveling along a length of the rail with the contacting member contacting the contact surface of the rail; selectively disengaging the drone from the rail; and flying away from the rail.

19 Claims, 3 Drawing Sheets

(56) References Cited

U.S. PATENT DOCUMENTS

2017/0287341 A1 10/2017 Jarrell
2020/0052512 A1 2/2020 Farrahi Moghaddam et al.
2020/0143718 A1 5/2020 Salem

* cited by examiner

DRONE RAILWAY SYSTEM

PRIORITY

The present application claims the benefit of domestic priority based on U.S. Provisional Patent Application 62/586,329 filed on Nov. 15, 2017, the entirety of which is incorporated herein by reference.

BACKGROUND

Unmanned aerial vehicles, or drones, have been quickly growing in popularity for recreational, commercial, and governmental uses. For example, drones are often used for movie shoots, surveillance, police reports, insurance claims, and recording videos of recreational sports. In recent years, with the growth of online shopping, drones have also started to be used for package deliveries.

It is easy to see that with the increasingly ubiquitous use of drones, there are more and more dangers and pitfalls associated with their flights. As the airways become congested with drones, there are navigational challenges and dangers of collisions. In addition, the increasing numbers of drones in the air can be an eyesore and can give people an uneasy feeling especially when drones are flying over personal property. Furthermore, drones are limited in their flight distance due to battery life issues. Finally, drone operation can be complicated by certain no-fly zones, such as airports or secured governmental facilities. Flying a drone through certain areas can be dangerous and/or costly, and flying in a no-fly zone is illegal. Flying around a no-fly zone can be inconvenient and time consuming.

Therefore, there is a need for a system that provides improved drone travel and navigation. There is further a need for a system that allows for reduced air congestion and/or reduced risk of collision for drones. There is still further a need for a system that reduces power consumption and/or allows for recharging of drones en route to a destination. There is still further a need for a system that allows a drone to travel safely through or near a no-fly zone.

SUMMARY

The present invention satisfies these needs. In one aspect of the invention, a drone railway system provides improved drone travel and navigation.

In another aspect of the invention, a drone railway system allows for reduced air congestion and/or reduced risk of collision of drones.

In another aspect of the invention, a drone railway system reduces power consumption and/or allows for recharging of drones en route to a destination.

In another aspect of the invention, a drone railway system allows one or more drones to travel safely through or near a no-fly zone.

In another aspect of the invention, a drone railway system comprises a rail comprising a contact surface and an interconnect member having a drone connecting end and a rail engaging end, wherein the rail engaging end comprises a contacting member. The rail engaging end is selectively engageable with the rail so the contacting member can contact the contact surface and selectively disengageable with the rail so the drone and interconnect member can fly away from the rail, whereby the drone and interconnect member are able to travel along the length of the rail when the rail engaging end is engaged with the rail.

In another aspect of the invention, a drone railway system comprises a rail comprising a channel and an opening into the channel, the channel having a contact surface, whereby a rail engaging end of an interconnect member that is connected to a drone may selectively pass through the opening and contact the contact surface so the drone can travel along the rail.

In another aspect of the invention, a drone railway system comprises an interconnect member that is connectable to a drone at one end and that has a rail engaging end at another end, the rail engaging end comprising a contacting member sized and shaped to contact a contact surface of a rail, wherein the rail engaging end is shaped so that the interconnect member can engage a rail when the rail engaging end is in one orientation and cannot engage the rail when in a second orientation.

In another aspect of the invention, a method of flying a drone comprises engaging a rail with the drone by contacting a contact surface of the rail with a contacting member associated with the drone; traveling along a length of the rail with the contacting member contacting the contact surface of the rail; selectively disengaging the drone from the rail; and flying away from the rail.

DRAWINGS

These features, aspects, and advantages of the present invention will become better understood with regard to the following description, appended claims, and accompanying drawings which illustrate exemplary features of the invention. However, it is to be understood that each of the features can be used in the invention in general, not merely in the context of the particular drawings, and the invention includes any combination of these features, where:

DESCRIPTION

The present invention relates to railway system for facilitating drone travel. In particular, the invention relates to a railway system to which drones can connect. Although the invention is illustrated and described in the context of being useful for package delivery, surveillance, etc., the present invention can be used in other ways, as would be readily apparent to those of ordinary skill in the art. Accordingly, the present invention should not be limited just to the examples and embodiments described herein.

Figures 1A, 1B:
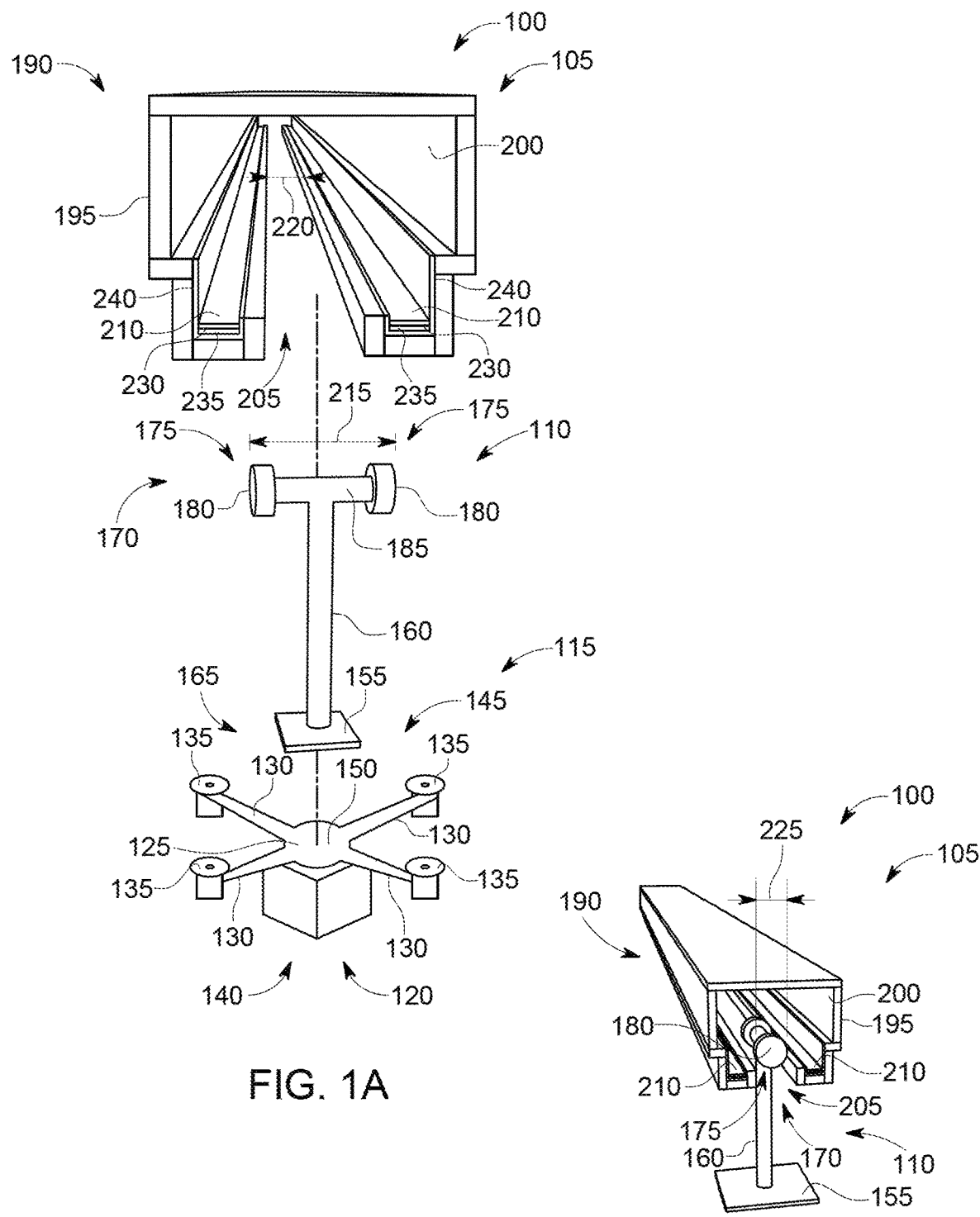
FIG. 1A is a schematic exploded perspective view of a drone railway system according to the invention.
FIG. 1B is a schematic view of the drone railway system of FIG. 1A in use and with the drone not shown for clarity.

FIG. 1A shows a drone railway system 100 according to one version of the invention. The drone railway system 100 is made up of a rail 105 and an interconnect member 110 that attaches to a drone 115 and allows the drone 115 to selectively connect to the rail 105. By drone it is meant any unmanned aerial vehicle, any unmanned aircraft system, any unmanned aircraft vehicle system, or any aircraft without an onboard human pilot. Drones are typically under control by a human operator and/or an autonomous onboard computer or any other control system that does not have an onboard human pilot. Drones typically use aerodynamic forces to provide vehicle lift and propulsion, can fly autonomously or by remote control, and can carry a payload 120. Examples of a payload 120 that can be carried by a drone 115 include cameras, packages, cargo, weapons, and/or the like.

A conventional drone 115 includes a body 125, one or more booms 130, and one or more propellers 135. The body 125 houses one or more batteries or other power storage systems, energy production systems such as solar cells or generators, the main boards, processors, avionics, cameras, and/or sensors. The booms 130 extend outwardly from the body 125 and support at their ends the propellers 135. The propellers 135 are independently operated and thus allow the drone 115 to lift itself from the ground and to travel in multiple directions and orientations, all in a manner known in the art. For example, the drone 115 may have a quadcopter configuration, as shown in FIG. 1A. Alternatively, the drone 115 may have fewer or more propellers or may have a propulsion mechanism other than propellers. Examples of drones on the market include the Freefly Systems ALTA UAV, the DJI Phantom 4, the DJI Mavic Air, the Parrot Bebop 2, and the Yuneec Typhoon H Pro. Drone technology is constantly evolving and improving, and the drone railway system 100 is not intended to be limited to any particular type of drone.

The interconnect member 110 is attached to the drone 115. In one version, the interconnect member 110 connects to a side of the drone 115 opposite the side that contains the payload 120. For example, as shown in FIG. 1A, the payload 120 can be stored on the bottom 140 of the drone 115 and the interconnect member 110 can attach to the top 145 of the drone 115. In this version, a top surface 150 of the body 125 receives the interconnect member 110. The interconnect member 110 can be permanently or releasably affixed directly to the top surface 150. The interconnect member may include a fixation plate 155 that is adapted to be affixed to the top surface 150 by any type of connection mechanism, such as screws, bolts, rivets, adhesive, and the like. The interconnect member 110 is thus carried by the drone 115 when the drone is in flight. In another version, the interconnect member 110 may be an integral part of the drone 115. In this version, the drone 115 includes a built-in interconnect member 110 or houses one inside the drone's body 125.

A post 160 of the interconnect member 110 connects the drone connecting end 165 of the interconnect member 110 to a rail engaging end 170 of the interconnect member 110. The rail engaging end 170 includes one or more contacting members 175 that are adapted to selectively contact a portion of the rail 105. In the version shown in FIG. 1A, the contacting members 175 can be two wheels 180 connected to the post 160 by a cross bar 185.

The rail 105 includes a longitudinal section 190 made up of a combination of bars 195 that define a channel 200 into which the rail engaging end 170 of the interconnect member 110 can be inserted. The bars 195 further define an opening 205 into the channel 200. The longitudinal section 190 can alternatively be a single extruded piece or a cast section instead of multiple bars. One or more contact surfaces 210, preferably two or more, in the longitudinal section 190 of the rail 105 are sized and shaped to receive the contacting members 175 of the interconnect member 110. In use, the contacting members 175 contact and rest on the contact surfaces 210 of the rail 105, and the contact surfaces 210 are capable of supporting at least a portion of the weight of the interconnect member 110, the drone 115, and its payload 120. The drone 115 is then able to travel along the length of the rail 105 while the interconnect member 110 maintains contact with the contact surfaces 210.

Entry into and exit from the channel 200 in the rail 105 can be accomplished as shown in FIG. 1B. The rail engaging end 170 of the interconnect member 110 has a transverse dimension 215 from contacting member 175 to contacting member 175 that is larger than the transverse size 220 of the opening 205. Thus, when in the orientation shown in FIG. 1A, the interconnect member 110 cannot enter into the channel 200. However, the front-to-back dimension 225 of the rail engaging end 170 of the interconnect member is smaller than the transverse size 220 of the opening 205. Thus, when turned to the orientation shown in FIG. 1B, the interconnect member 110 can be inserted into the channel 200. Once inserted into the channel 200, there is sufficient room for the interconnect member 110 to be returned to its forward orientation where the contacting members 175 are oriented with the contact surfaces 210 of the rail 105. The navigational features of the drone 115 are able to properly orient the drone 115 and the interconnect member 110 for connection and disconnection to the rail 105. Other keying type of entry designs can be provided where the drone can be engaged with the rail 105 in one configuration or orientation and can be prevented from engaging in another configuration or orientation.

The rail 105 can be made up of one or more longitudinal sections 190. The longitudinal sections 190 can be substantially straight or can be at least partially curved. The curves can be upward, downward, or sideways. A drone 115 that is connected to the rail 105 by the interconnect member 110 can travel short or long distances along the rail 105. In one version, the rail 105 can be a single longitudinal section 190. In another version, the rail 105 can be composed of an extensive system of longitudinal sections 190 that extend for miles and in multiple directions.

There are numerous advantages associated with the drone 115 traveling while connected to the rail 105. For example, drone operators do not have to be concerned with navigating their drone through traffic or obstacles. There is no need to worry about hitting birds, planes, or other drones. Also, since at least a portion of the weight of the drone 115 can be supported by the rail 105, the energy expenditure of the drone 115 can be reduced and battery life extended. In addition, the rail 105 can provide passage through otherwise restricted spaces, such as the airspace near airports or no-fly zones. When a drone needs to fly through such a restricted space, the drone can attach to a rail 105 provided through the restricted space. In addition, the drone railway system 100 provides added safety for drone flight. For example, in the event of a loss of power or other malfunction of a drone 115, if the drone 115 is connected to the rail it won't do any damage to life or property whereas an unconnected drone could crash into various objects or people. Furthermore, as drones become more and more used for deliveries of packages or other deliverables, the drone railway system 100 of the present invention will allow multiple drones to fly in a more orderly fashion. Without such a railway system, drone air traffic can easily start to overwhelm the airways and become dangerous and an annoyance.

In one version of the drone railway system 100, the rail 105 provides an additional charging feature. The distance a drone 115 can currently travel is limited by the life of the battery in the drone 115. For a drone 115 to return safely to its point of origin, the drone 115 can only travel for one-half of its battery life. Accordingly, if a drone 115 has a battery life of 30 minutes, the drone 115 can travel away from its charging station for 15 minutes before it must turn around and return. Because of this, the usefulness of conventional, affordable drones in the delivery business is limited. However, by providing the ability to charge the drone 115 while the drone 115 is connected to the rail 105, the drone 115 can travel significantly longer and almost unlimited distances.

In this charging version of the drone railway system 100, the contact surfaces 210 of the rail 105 can be made of a conductive material, such as one or more of iron, steel, copper, aluminum, or alloys thereof, or other similar metals or conductors, or non-conductors such as plastic coated with a conductive material. An electrical current can be provided to the contact surfaces 210 by an insulated cord connected to a power source. Also in this version, the rail contacting members 175 of the interconnect member 110 can be made of an electrically conductive material, such as one or more of iron, steel, copper, aluminum, or alloys thereof, or other similar metals or conductors, or non-conductors such as plastic coated with a conductive material. The contacting members 175 can also be electrically connected with the drone's battery by an electrical connector passing through the cross bar 185 and the post 160 and into and/or onto the body 125 of the drone 115. Thus, when the contacting members 175 contact the electrically charged contact surfaces 210 of the rail 105, the battery of the drone can be charged.

The charging version of the drone railway system 100 allows a drone 115 or multiple drones 115 to travel great distances. The battery of each drone does not have to be replaced or dependent on finding a charging station or solar charging. Instead, the drone 115 is recharged while connected to the rail 105. A drone 115 can charge while en route to a location, can disconnect and fly to its destination, and can return to the rail 105 and be recharged by the rail 105 on its return. By providing an extensive rail system, such as attaching rails to existing power lines and/or telephone poles and/or supporting poles built specifically for the drone railway system 100, it is easy to envision how drones 115 can be provided the ability to travel to almost any location. This system is particularly useful in the delivery business where a drone 115 needs to be able to access remote addresses. The use of drones 115 for deliveries has a positive impact on the environment by reducing the number of vehicles on the roads. In addition, delivery time can be accurately measured, and accurate delivery times can be more precisely estimated. Furthermore, deliveries would be possible during inclement weather without having humans subject themselves to the weather conditions.

The drone railway system 100 can be equipped with additional features, as shown in FIG. 1A. For example, the contact surfaces 210 can be made up of a replaceable conductive strip 230 that sits on one or more permanent conductive and/or non-conductive strips 235. The replaceable conductive strip 230 can be periodically replaced so that wear and tear do not negatively affect the functionality of the system. In one particular version, there are three layers provided. The top layer being a replaceable conductive strip 230, the second layer being a non-replaceable conductive strip, and the third layer being a non-conductive strip. The second layer is a permanent conductive layer connected to a cord or wire that is attached to a power supply. In addition, one or more insulators 240 made of non-conductive material may be provided to prevents shorts and unwanted current.

Propulsion of the drone 115 while connected to the rail 105 can occur in numerous manners. For example, in one version, the drone 115 can be propelled by its own propellers in a forward direction while the contacting members 175 contact the contact surfaces 210 of the rail 105. The contact surfaces 210 can support at least a portion of the weight of the drone 115, the interconnect member 110, and the payload 120 if present so that the drone 115 does not have to expend power on lifting itself and its components off the ground. In one version, the contacting members 175 can slide along the contact surfaces 210. In another version, the contacting members 175 can comprise freely rotatable wheels 180 that are pivotally connected to the cross bar 185. In this version, the wheels 180 roll along the contact surfaces 210 as the drone 115 travels along the rail 105.

In another version, the propulsion of the drone 115 can be accomplished by rotation of the wheels 180. In this version, the wheels 180 are connected to one or more motors that are capable of causing rotation of the wheels 180. The one or more motors can be provided within the post 160, within the cross bar 185, or within the wheel 180 or at a different position in the interconnect member 110. While the wheels 180 are in contact with the contact surfaces 210, the drone 115 is caused to move along the rail 105. In one version, the motor can drive an axle that extends through the cross bar 185 so that the wheels 180 are turned together. In another version separate motors and/or separate axles allow for the wheels 180 to be independently turned. With this version, one wheel 180 can be turned faster than the other to allow the device to turn. In one version, the interconnect member 110 is used instead of the drone propellers to move the drone 115 when connected to the rail 105. Alternatively, the motor and wheels can be used along with the propellers to supplement the movement. The motor can be powered by the electrical current from the contact surfaces 210, can be powered by a generator within the interconnect member 110 or within the drone, can be powered by the drone's battery, and/or can have a battery or other power storage device that is powered by the contact surfaces.

Figures 2A, 2B:
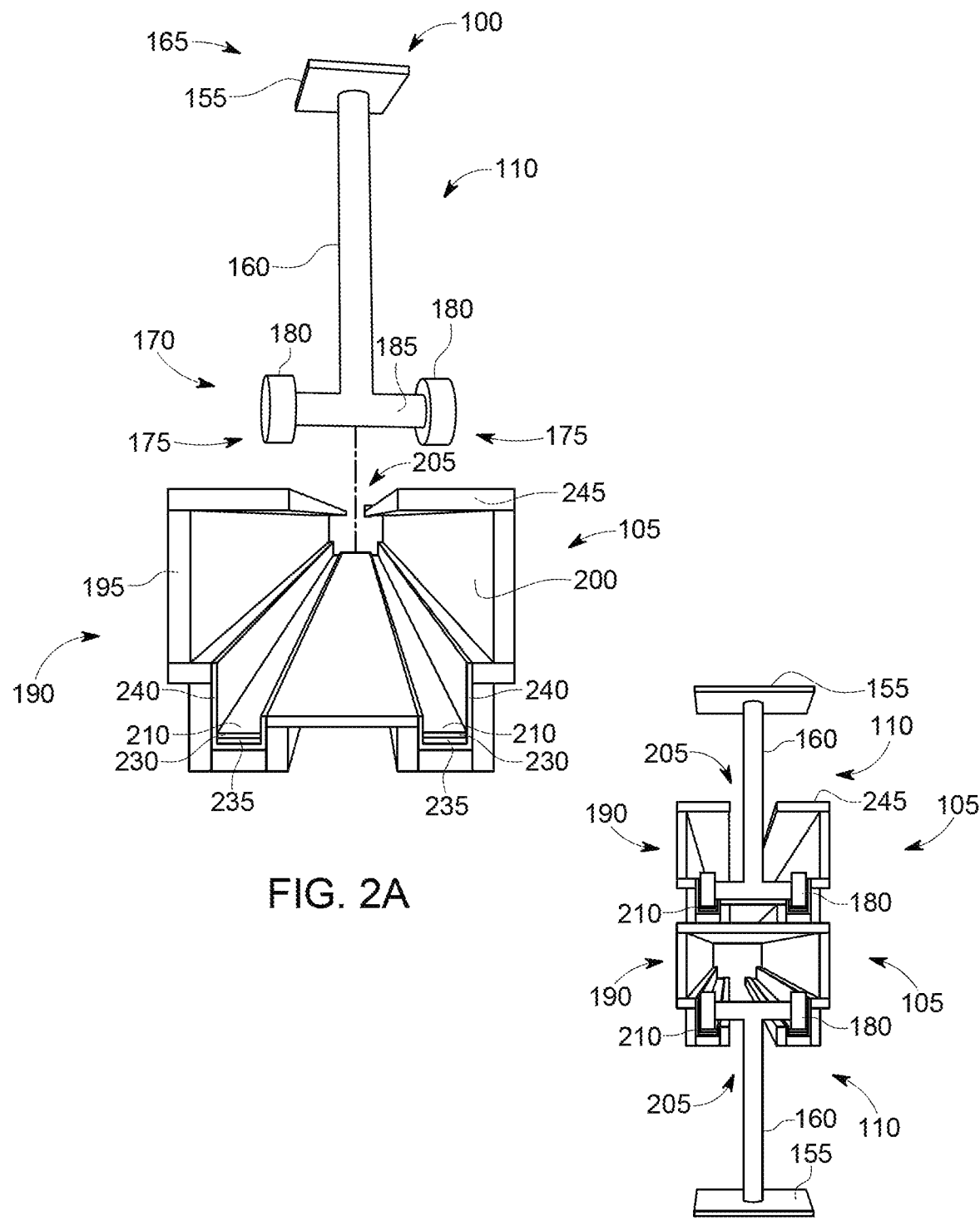
FIG. 2A is a schematic exploded perspective view of another version of a drone railway system with the drone not shown for clarity.
FIG. 2B is a schematic partially sectional view of another version of a drone railway system with drones not shown for clarity.

Another version of the drone railway system 100 is shown in FIG. 2A. In this version, the opening 205 into the channel 200 of the rail 105 is in a top portion 245 of the rail 105. The interconnect member 110 may be connected to the bottom 140 of the drone (not shown), or the interconnect member 110 may be connected to the top 145 of the drone and the drone can be flown upside-down. The rail engaging end 170 of the interconnect member is oriented for insertion into the opening 205 in the top portion 245, then reoriented to its forward facing orientation within the channel 200 in much the same way as shown in FIG. 1B. Once properly oriented, the unit is lowered so that the contacting members 175 of the interconnect member 110 contact the contact surfaces 210 of the rail 105.

In one version, the rail 105 can be made of a single rail. In the single rail version, a drone 115 travels in one direction similar to a one-way street. In order to travel in the opposite direction, the rail makes two right-angle turns, as will be discussed below, or the rail is in the form of a loop.

In another version of the drone railway system 100 the rail 105 comprises multiple rails connected to or in proximity to one another. This version is useful in areas where a significant amount of traffic is expected. In one particular version, a two-rail system can have one rail dedicated for travel in one direction and the other rail can be dedicated for travel in the opposite direction. In one version, the rail 105 comprises two bottom-opening parallel railways, and each railway allows for travel in opposite directions. The travel directions of either railway can be changed at any time, for example to prevent traffic jams or for emergencies. Another example of this version is shown in FIG. 2B where a rail 105 similar to the version of FIG. 2A is positioned on top of a rail 105 similar to the version of FIG. 1A. The version shown is particularly useful for package delivery applications. A drone (not shown in FIG. 2B) can carry a payload to or near a delivery site on the lower rail 105, and then on its return can orient itself upside-down for connection to the upper rail 105 and a return to its site of origin. In an alternative application of the version of FIG. 2B, one of the rails can be used for one application, such as delivery, and the other rail can be used for a different application, such as surveillance.

In another version, the rail 105 can comprise more than two parallel railways. For example, one version has three parallel railways. The three can all be side by side, there can be two top-open rails and one bottom-open rail, or there can be one top-open rail and two bottom-open rails. In yet another version, a four railway system uses two bottom-open rails and two top-open rails. Other arrangements and combinations are similarly possible.

Figure 3A:
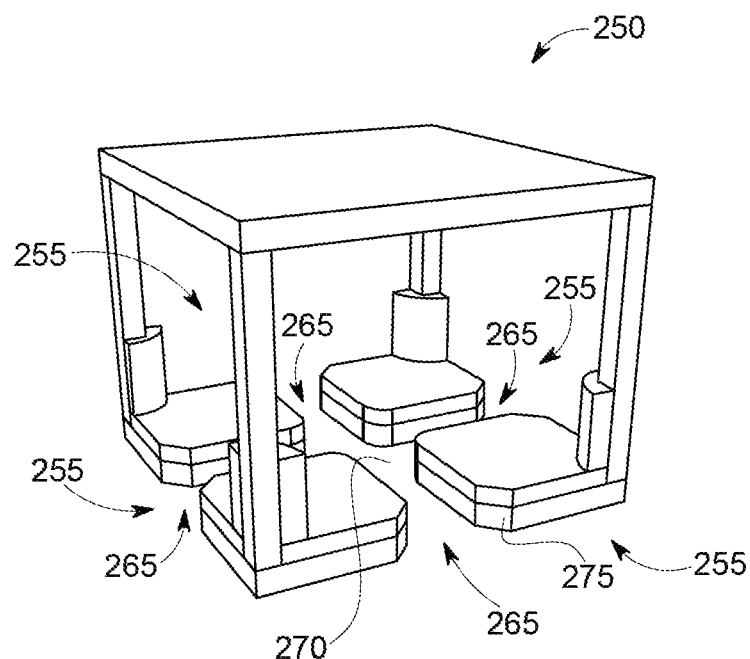
FIG. 3A is a schematic perspective view of an intersection block connector as part of the drone railway system.
Figure 3B:
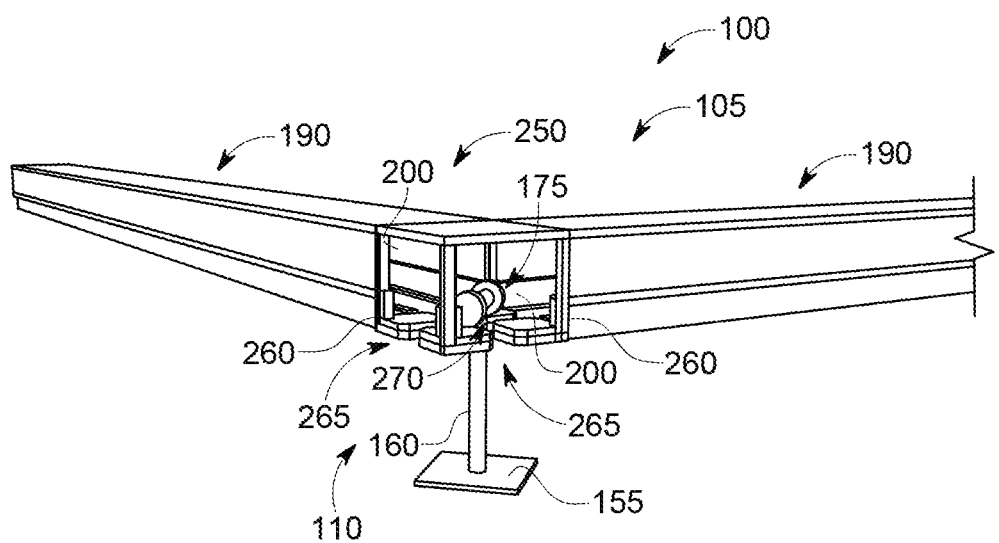
FIG. 3B is a schematic perspective view of the intersection block connector of FIG. 3A in use in the drone railway system with the drone not shown for clarity.

FIGS. 3A and 3B show a drone railway system 100 according to a version of the invention where the rail 105 includes junctions and/or turns. FIG. 3A shows an intersection block connector 250 that can be used to connect two or more longitudinal sections 190 of the rail 105. In the version shown, the intersection block connector 250 includes four sides 255 that are each connectable to an end 260 of a longitudinal section 190. Openings 265 in the intersection block connector 250 align with the opening 205 in the longitudinal sections 190. At a central opening 270 in the intersection block connector 250 access is provided to the openings 205 in all of the longitudinal sections 190 connected to the intersection block connector 250. At this central opening 270, the drone (not shown) can orient itself so that it may travel into and along any of the longitudinal sections 190. The openings 265, 270 can be tapered to form a chamfer 275 to facilitate movement and rotation. The intersection block connector 250 can be designed to have two, three, four or more longitudinal sections 190 intersect. The longitudinal sections 190 can be at approximately 90 degrees relative to one another or can be at any other desirable angle. The longitudinal sections 190 may also be angled upwardly or downwardly relative to one another. The intersection block connector 250 can be made of non-conducting material as the polarity of the connected rails might otherwise cause shorting. The rail 105 can be supported by poles or other structures sufficiently strong to support the weight of the rail 105, the drones 115 and interconnect members 110 and payload 120 being supported by the rail 105, and any additional features such as power supplies, wires, cables, antennae, communication systems, and the like.

The drone railway system 100 of the present invention is designed and constructed, among other reasons, to prevent uncontrollable descent and/or uncontrollable flights of drones 115 in addition to extending the flight time of drones 115.

While one version of a connection system has been described for connecting the interconnect member 110 to a rail 105, numerous other mechanisms can be alternatively or additionally used. For example, the connection system can use one or more of hooks, clamps, sticks, poles, spheres, rods, and the like. The connection system should allow for selective connection and disconnection of the drone 115 to the rail 105. In one version, the connection system can comprise a hitch attachment where the drone 115 becomes disengaged from the rail 105 by flying upward so that the attachment is not in contact with the rail ceiling or contact surfaces of the rail and rotating a spindle until a wheel axis is parallel to the rail's track.

In another attachment system, the attachment system has two parts. A first part remains on the rail 105 at all times, and the second part is attached to the drone 115. Instead of having the drone fly up to the rail 105, the first part has a rope/wire reeling system outfitted with a hook or hitch to secure the drone with the use of hooks or clamps on the second part to pull it up to the rail 105.

Each portion of the rail 105 can be equipped with a transceiver that connects to a communication system that provides each portion of the rail 105 the ability to transmit signals to and receive signals from the other portions of the rail 105 and/or drones 115 on the rail 105. Such signals can contain information such as but not limited to identification of each drone 115 on the rail 105 or near the rail 105, the travel direction of the rail 105, the weight the portion of the rail 105 can carry, the lack of power or electricity in other portions of the rail 105, the need for debris to be cleared from the rail 105, the presence of a stationary, malfunctioning, or non-functioning drone 115 on the rail 105, each drone's assigned route, and/or the like. In one version, when there is a malfunctioning or non-functioning drone on the rail 105, the rail 105 alerts a rail operating system of the non-functioning drone which deploys a disengagement prevention protocol to prevent the drone from disengaging the rail 105. This disengagement prevention protocol may also be deployed by the operating system when the rail is situated in a restricted airspace. In one version, when a lack of or loss of power is detected in a portion of the rail 105, the rail 105 or its neighboring rails alert a rail operating system of the power loss which deploys a protocol to repair the rail 105 and to redirect drones away from the portion of the rail until repairs are completed.

The communication system can also provide the ability of transmitting and receiving signals between each drone 115, the owner and/or operator of each drone, and/or government agencies either directly or indirectly with the rail operating system. Such information can include but is not limited to one or more of the unique ID of each drone 115, the location/coordinates of each drone, the pre-approved paths and areas for each drone, each drone's altitude, each drone's destination or destinations, and the health status of each drone, including malfunctions, battery condition, presence of cargo and weight and dimensions of cargo, and the like. Due to current United States drone operating restrictions, drone operators are only allowed to fly drones within their line of sight for safety concerns. In one version, drone operators can use the communication system to remotely operate drones beyond their line of sight.

In one version, a rail 105 or a portion of a rail 105 can serve as parking areas for drones 115. The parking areas can be connected to another portion of the rail 105 by an intersection block connector 250. In one particular version, the parking areas can store security drones or emergency drones that are available 24 hours a day for surveillance or emergency support. For example, these drones can provide 24 hour surveillance, video streaming of incidents and accidents, carry emergency supplies for first responders, track criminals or criminal activity, and/or provide access to areas otherwise difficult to reach.

Although the present invention has been described in considerable detail with regard to certain preferred versions thereof, other versions are possible, and alterations, permutations and equivalents of the version shown will become apparent to those skilled in the art upon a reading of the specification and study of the drawings. For example, the cooperating components may be reversed or provided in additional or fewer number. Also, the various features of the versions herein can be combined in various ways to provide additional versions of the present invention. Furthermore, certain terminology has been used for the purposes of descriptive clarity, and not to limit the present invention. Therefore, any appended claims should not be limited to the description of the preferred versions contained herein and should include all such alterations, permutations, and equivalents as fall within the true spirit and scope of the present invention.

What is claimed is:

1. A drone railway system comprising:
   a rail comprising a contact surface comprising a conductive material;
   an interconnect member having a drone connecting end and a rail engaging end, wherein the rail engaging end comprises a contacting member comprising a conductive material; and
   a connector adapted to connect the contact surface to a power source so that current can be applied to the contact surface;
   wherein the rail engaging end is selectively engageable with the rail so the contacting member can contact the contact surface and selectively disengageable with the rail so the drone and interconnect member can fly away from the rail and wherein when a current is applied to the contact surface it can be supplied through the contacting member to the interconnect member or the drone, whereby the drone and interconnect member are able to travel along the length of the rail when the rail engaging end is engaged with the rail.

2. A drone railway system according to claim 1 wherein the rail comprises a channel and an opening into the channel, the channel having the contact surface, wherein the rail engaging end of the interconnect member can selectively pass through the opening into the channel.

3. A drone railway system according to claim 1 wherein the rail comprises a channel and an opening into the channel, the channel having the contact surface, wherein the rail engaging end of the interconnect member can selectively pass through the opening into the channel when in one orientation and cannot pass through the opening into the channel when in another orientation.

4. A drone railway system according to claim 1 wherein the contact surface can support at least a portion of the weight of the drone when the rail engaging end is engaged with the rail.

5. A drone railway system according to claim 1 wherein the rail comprises two contact surfaces, wherein the rail engaging end comprises two contacting members, and wherein the contact surfaces are sized and shaped to receive the contacting members.

6. A drone railway system according to claim 1 wherein the contact surface comprises a replaceable conductive strip.

7. A drone railway system according to claim 1 wherein the contacting member comprises a wheel, wherein the interconnect member comprises a motor that rotates the wheel, and wherein the drone and interconnect member may travel along the rail by being propelled by the rotation of the wheel.

8. A drone railway system according to claim 1 wherein the contacting member comprises a wheel and wherein the drone and interconnect member may travel along the rail by being propelled by the drone.

9. A drone railway system according to claim 1 wherein the rail is at least one mile long.

10. A drone railway system according to claim 1 wherein the rail comprises multiple rails, each rail having a contact surface separately engageable by the rail engaging end.

11. A drone railway system according to claim 1 wherein the rail comprises a transceiver that connects to a communications system and that transmits information concerning the engagement of a drone with the rail, information concerning the position or location of the drone, information concerning the control or operation of the drone, or information concerning the railway system.

12. A drone railway system comprising:
    a rail comprising a contact surface; and
    an interconnect member having a drone connecting end and a rail engaging end, wherein the rail engaging end comprises a contacting member;
    wherein the rail comprises an intersection block connector that connects two or more longitudinal sections that are not aligned with one another, and wherein the rail engaging end is selectively engageable with the rail so the contacting member can contact the contact surface and selectively disengageable with the rail so the drone and interconnect member can fly away from the rail, whereby the drone and interconnect member are able to travel along the length of the rail when the rail engaging end is engaged with the rail.

13. A drone railway system comprising:
    a rail comprising a channel and an opening into the channel, the channel having a contact surface,
    whereby a rail engaging end of an interconnect member that is connected to a drone may selectively pass through the opening and contact the contact surface so the drone can travel along the rail, and
    wherein the rail comprises a transceiver that connects to a communications system and that transmits information concerning the engagement of a drone with the rail, information concerning the position or location of the drone, information concerning the control or operation of the drone, or information concerning the railway system.

14. A drone railway system according to claim 13 wherein the contact surface comprises conductive material and wherein when a current is applied to the contact surface, a drone engaged in the rail can be powered or charged.

15. A drone railway system comprising:
    a drone,
    a rail comprising a contact surface, and
    an interconnect member that is connectable to a drone at one end and that has a rail engaging end at another end, the rail engaging end comprising a contacting member sized and shaped to contact the contact surface of the rail,
    wherein the rail engaging end is shaped so that the interconnect member can engage the rail when the rail engaging end is in one orientation and cannot engage the rail when in another orientation, whereby the drone can engage the rail, disengage from the rail, and then re-engage the rail.

16. A drone railway system according to claim 15 wherein the contacting member comprises a conductive material, and wherein when a current is supplied to the contact member, the drone can be powered or charged.

17. A method of flying a drone, the method comprising:
    engaging a rail with the drone by contacting a contact surface of the rail with a contacting member associated with the drone;

traveling along a length of the rail with the contacting member contacting the contact surface of the rail;

selectively disengaging the drone from the rail;

flying the drone away from the rail; and returning the drone to the rail and re-engaging the rail.

18. A method according to claim 17 wherein the contact surface and the contacting member comprise conductive materials and wherein the drone is powered or charged by a current applied to the contacting surface and supplied to the contacting member.

19. A method according to claim 17 further comprising providing a transceiver that connects to a communications system and that transmits information concerning the engagement of the drone with the rail, information concerning the position or location of the drone, information concerning the control or operation of the drone, or information concerning the railway system.

\* \* \* \* \*